Figure 1:
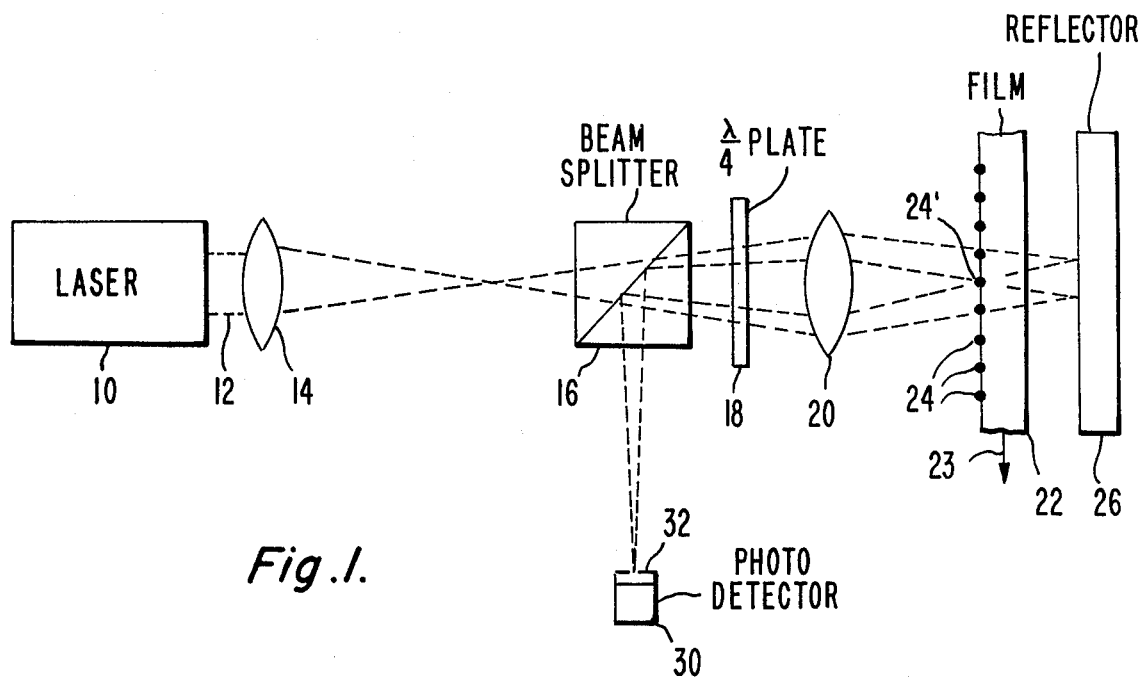

United States Patent [19]

Reno et al.

[11] 4,105,926
[45] Aug. 8, 1978

[54] ON-AXIS FILM SCANNER WITH REFLECTED ILLUMINATION

[75] Inventors: Charles William Reno, Haddonfield; Donald George Herzog, Collingswood, both of N.J.

[73] Assignee: RCA Corporation, New York, N.Y.

[21] Appl. No.: 811,869

[22] Filed: Jun. 30, 1977

[51] Int. Cl.² .............................................. G06K 7/10
[52] U.S. Cl. ................................... 250/566; 250/568; 365/127; 235/454
[58] Field of Search ............... 250/566, 568, 570, 225; 350/7; 365/127, 120; 235/454

[56] References Cited

U.S. PATENT DOCUMENTS

| 3,403,262 | 9/1968 | Seidel | 250/568 |
|---|---|---|---|
| 3,919,698 | 11/1975 | Bricot | 250/566 |

OTHER PUBLICATIONS

T. J. Harris, Optical Memory Readout Apparatus, IBM Tech. Bul., vol. 7, No. 12, May 1965, p. 1199.

*Primary Examiner*—M. Tokar
*Attorney, Agent, or Firm*—H. Christoffersen; Samuel Cohen; Carl V. Olson

[57] ABSTRACT

A scanner for reading binary digit spots on a transparent film includes a laser light beam which is directed through a beam splitter and through the film to a mirror, from which it is reflected back through the film to illuminate a small area on the film. Light which is not blocked by a recorded spot on the film continues back to the beam splitter, from which the beam is directed to a photodetector. The photodetector is positioned to receive light from solely a portion of the illuminated area of the film, to provide high definition scanning not adversely affected by distortion of the illuminating light beam by imperfections in the film and mirror.

11 Claims, 2 Drawing Figures

ON-AXIS FILM SCANNER WITH REFLECTED ILLUMINATION

Scanning optical readers usually operate by detecting the light reflected from an illuminated spot on the surface of graphic copy. These scanners which respond to reflected light do not lend themselves very well to being constructed as parallel arrays in which a large number of closely-spaced parallel tracks on the copy are simultaneously read. A signal crosstalk occurs due to the fact that some of the light reflected from each track reaches photodetectors intended to receive light reflected from other respective nearby tracks. It is also known to construct a scanning optical reader to operate by detecting light transmitted through a transparent film containing opaque indicia on one surface of the film. This construction has the disadvantage of requiring the precise alignment of optical elements on both sides of a moving film. Furthermore, the arrangement cannot be used in scanners having a curved metal shoe on the back side of the film to guide the film during scanning.

These disadvantages in prior art arrangements are overcome, according to an example of the present invention, by an on-axis scanning arrangement in which a scanning light beam is passed through a transparent film containing indicia to a reflector, from which the beam is returned to illuminate a small area or spot or the film. Light from a portion of the illuminated spot, in the absence of opaque indicia thereat, is transmitted to a photodetector.

Figure 2:
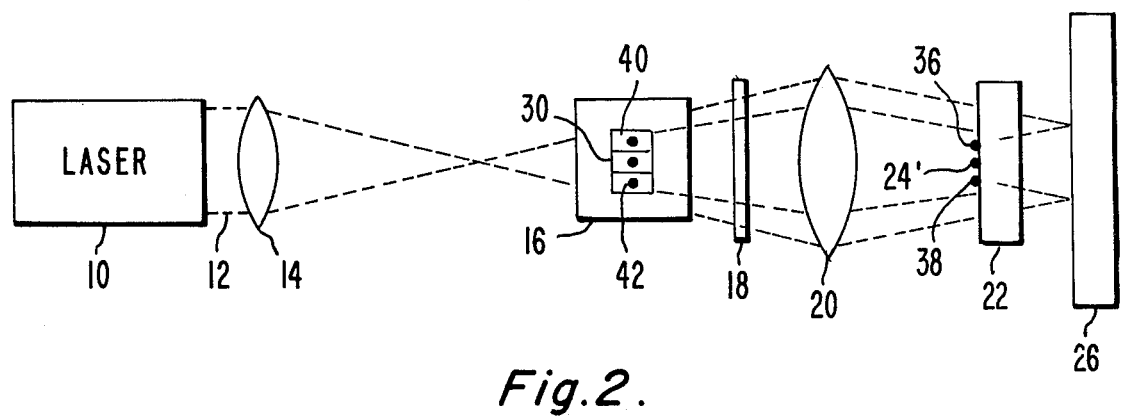

In the drawing:

FIG. 1 is a plan view of an on-axis scanning optical reader constructed according to the teachings of the invention; and FIG. 2 is a side view of the optical reader of FIG. 1.

Referring in greater detail to FIG. 1 of the drawing, a conventional laser 10 produces a polarized beam of light 12 which is acted on by a lens 14 to translate the beam to one of enlarged cross section which is diverging where it enters a polarizing or polarized beam splitter 16. The light beam passed through the beam splitter 16 encounters a quarter-wave plate 18 and then a microscope objective type of lens 20 which converges the diverging beam. The converging beam then passes through a transparent film having opaque indicia 24, which may represent binary digits, on the front surface thereof, to a reflector 26, from which the beam is reflected back and through the film 22. The light passed back through the film 22 returns through lens 20 and plate 18 to the beam splitter 16. Light returning to the beam splitter is directed toward a photodetector 30 having a small iris 32.

The lens 20 is selected and positioned so that the converging beam from this lens passes through the film 22 with a substantial cross sectional dimension which is much larger than the diameter of the opaque binary digit spots 24 located on one surface of the film 22. The reflector 26 is positioned so that the converging beam is reflected to a small area or spot at the front surface of the film 22 containing the indicia 24. The aperture in the iris 32 of the photodetector 30 passes light to the photodetector from solely a portion of the area or spot on the front surface of the film which is illuminated by reflection from mirror 26. The photodetector receives light from a very small area on the film having a diameter comparable with the diameter of the indicia spots 24.

The light path between the film 22 and the photodetector 30 does not contain light-disturbing elements which would decrease the definition with which the film is scanned. This favorable condition can be compared with the poorer definition that would be obtained if the system were constructed so that the photodetector 30 received all the illumination focused on a spot on the front surface of the film 22 after passing twice through the optically-imperfect film 22 and being reflected by an optically-imperfect mirror 26. The definition of the scanner is maximized by dimensioning the optical system in a known manner, so that the illumination directed from the mirror 26 through the film 22 illuminates the full useful aperture of the lens 20. Operated in this way, that is, with the full useful aperture of the lens, on playback, filled with the image of a spot on the film, aberration from the film base or from a non-flat or aspheric mirror do not defeat the system.

In the operation of the optical scanner, the film 22 is moved in the direction 23 relative to the remainder of the apparatus by any suitable known means. The laser produces a beam having a polarization such that it passes directly through the beam splitter 16. The quarter-wave plate 18 causes a 45° rotation of the polarization of the light beam passed through it. The beam passing through the film 22 has a cross sectional dimension which is large compared with the diameters of the opaque spots 24, representing 1's. At least half of the light in the beam passes through the film. The reason is that, in general, approximately half the spots 24 are opaque (represent 1's) and the other half transparent (represent 0's) and, in addition, substantial blank (transparent) guard-band space is present between bit positions.

The wide beam passing through the film 22 is reflected by reflector 26 to a small area or spot 24' on the surface of the film 22 where an opaque 1 bit, or a clear 0 bit, is located. A portion, comparable to the size of a recorded information bit, of the illuminated area or spot is imaged in the aperture of the iris 32 of photodetector 30. If the bit is opaque, the light is blocked from reaching the photodetector 30. On the other hand, if the bit is clear, the light continues back through lens 20 and through plate 18 which rotates the polarization of the light an additional 45°. The light then has been rotated a total of 90° and on reaching the beam splitter is caused to be reflected to the photodetector 30. The photodetector produces an electrical signal output representing a 0 bit when a clear bit location is scanned, and the absence of an electrical signal output, or a different electrical signal output, representing a 1 bit when an opaque bit location is scanned.

In the plan view shown in FIG. 1, one track of information bits 24 on the film 22, and one photodetector 30 are visible. In practice, there may be N parallel tracks and N respective detectors. This is illustrated in FIG. 2, which is a side view of FIG. 1, showing three parallel tracks on the film storing bits 36, 24' and 38, respectively, and a corresponding plurality of side-by-side photodetectors 40, 30 and 42, respectively. The optical system is arranged to simultaneously illuminate the row of bits 36, 24' and 38 in the corresponding plurality of tracks. The plurality of photodetectors 40, 30 and 42 each respond to light solely from a very small area (corresponding with the size of an information bit) on the respective track without receiving any unwanted light from other small areas on the same and other tracks.

What is claimed is:

1. Apparatus for reading indicia elements on transparent film, comprising
   a source of a light beam,
   a reflector, and
   means to direct said light beam from said source through said film to said reflector, and back to a point on said film, said beam when initially passing through said film having a much larger cross sectional dimension than indicia elements on the film and much larger than it is when returned back to said point on said film.

2. Apparatus according to claim 1 in which said source of a light beam is a laser.

3. Apparatus according to claim 1 in which said indicia and point on the film is on the surface of the film which is nearest to said source of a light beam.

4. Apparatus according to claim 1 in which said point on the film has a cross sectional dimension larger than the diameter of indicia elements on said transparent film.

5. Apparatus according to claim 1 in which said means to direct a light beam includes a beam splitter, and in addition, a photodetector positioned to receive light from said beam splitter which is transmitted back through said film to the beam splitter.

6. Apparatus according to claim 5 wherein said source of a light beam produces a polarized laser beam, wherein said beam splitter is a polarized beam splitter, and wherein said means to direct a light beam includes a quarter-wave plate effectively positioned between said beam splitter and said film.

7. An on-axis scanner for detecting opaque indicia on transparent film comprising
   a source of a light beam and a beam splitter on one side of said film
   a reflector on the opposite side of said film,
   means to direct light from said source through said beam splitter and said film to said mirror and then back through the film to illuminate a small area on the front surface of said film, and
   a photodetector positioned to receive light through said beam splitter from solely a portion of said illuminated area of said film,
   whereby said scanner has a high definition independent of distortion of said illuminating light beam due to imperfections in said film and said mirror.

8. A scanner as defined in claim 7 wherein said means to direct light from said source includes a lens located between said beam splitter and said film.

9. A scanner as defined in claim 8 wherein the light illuminating the small area on the front surface of the film substantially fills the aperture of said lens.

10. A scanner as defined in claim 8 wherein said beam splitter is a polarizing beam splitter, further including a quarter-wave plate which is positioned between said beam splitter and said lens.

11. A scanner as defined in claim 7, wherein said film includes parallel tracks of recorded indicia all of which are illuminated, and said photodetector comprises an equal plurality of photodetectors each responsive to light from solely a respective one of said tracks.

* * * * *